United States Patent
Doya et al.

(10) Patent No.: US 10,333,143 B2
(45) Date of Patent: Jun. 25, 2019

(54) METHOD OF MANUFACTURING REACTION AGGLOMERATED PARTICLES, METHOD OF MANUFACTURING CATHODE ACTIVE MATERIAL FOR LITHIUM ION BATTERY, METHOD OF MANUFACTURING LITHIUM ION BATTERY, LITHIUM ION BATTERY, AND DEVICE OF MANUFACTURING REACTION AGGLOMERATED PARTICLES

(71) Applicant: TSUKISHIMA KIKAI CO., LTD., Tokyo (JP)

(72) Inventors: Yo Doya, Tokyo (JP); Hidenori Goto, Tokyo (JP)

(73) Assignee: TSUKISHIMA KIKAI CO., LTD., Tokyo (JP)

( * ) Notice: Subject to any disclaimer, the term of this patent is extended or adjusted under 35 U.S.C. 154(b) by 287 days.

(21) Appl. No.: 14/409,347

(22) PCT Filed: Feb. 15, 2013

(86) PCT No.: PCT/JP2013/053629
§ 371 (c)(1),
(2) Date: Dec. 18, 2014

(87) PCT Pub. No.: WO2013/190861
PCT Pub. Date: Dec. 27, 2013

(65) Prior Publication Data
US 2015/0188133 A1   Jul. 2, 2015

(30) Foreign Application Priority Data
Jun. 21, 2012   (JP) .................................. 2012-139618

(51) Int. Cl.
*H01M 4/00* (2006.01)
*H01M 4/505* (2010.01)
(Continued)

(52) U.S. Cl.
CPC ............ *H01M 4/505* (2013.01); *B01D 9/004* (2013.01); *B01D 9/0009* (2013.01); *B01J 8/14* (2013.01);
(Continued)

(58) Field of Classification Search
CPC .... H01M 4/505; H01M 4/525; H01M 4/5825; H01M 10/0525; B01J 19/2405; B01J 8/0271; B01J 14/00; B01J 14/005
(Continued)

(56) References Cited

U.S. PATENT DOCUMENTS 4,320,243 A   3/1982  Chauvin et al.
4,377,344 A   3/1983  Hentschel et al.
(Continued)

FOREIGN PATENT DOCUMENTS

GB   1453469   * 10/1976
JP   S5594630 A   7/1980
(Continued)

OTHER PUBLICATIONS

Translation of JP2004-047182, Feb. 2004.*
Translation of JP2010-090411, Apr. 2010.*

*Primary Examiner* — Steven J Bos
(74) *Attorney, Agent, or Firm* — Muncy, Geissler, Olds & Lowe, P.C.

(57) ABSTRACT

Liquid flow in a reaction processing vessel 10 is set to a spiral flow, a liquid A and B as an additional liquid containing an inorganic substance to be added is injected at a center-side position with respect to an inner surface of the reaction processing vessel 10 in a reaction field of the reaction processing vessel 10 so as to perform reaction processing.

12 Claims, 26 Drawing Sheets

(51) Int. Cl.
*H01M 10/0525* (2010.01)
*C01G 53/00* (2006.01)
*B01D 9/00* (2006.01)
*B01J 19/18* (2006.01)
*B01J 19/24* (2006.01)
*H01M 4/525* (2010.01)
*B01J 8/14* (2006.01)
*C01G 53/04* (2006.01)
*C01G 53/06* (2006.01)
*H01M 4/58* (2010.01)
*H01M 4/02* (2006.01)

(52) U.S. Cl.
CPC ........... *B01J 19/18* (2013.01); *B01J 19/1806* (2013.01); *B01J 19/2405* (2013.01); *B01J 19/245* (2013.01); *B01J 19/2465* (2013.01); *C01G 53/006* (2013.01); *C01G 53/04* (2013.01); *C01G 53/06* (2013.01); *H01M 4/525* (2013.01); *H01M 4/5825* (2013.01); *H01M 10/0525* (2013.01); *B01D 9/0036* (2013.01); *B01J 2208/003* (2013.01); *B01J 2219/0011* (2013.01); *B01J 2219/00114* (2013.01); *B01J 2219/00164* (2013.01); *B01J 2219/24* (2013.01); *C01P 2004/03* (2013.01); *H01M 2004/028* (2013.01)

(58) Field of Classification Search
USPC ................. 429/218.1–231.95; 422/187, 234; 423/594.3, 179.5, 659
See application file for complete search history.

(56) References Cited

U.S. PATENT DOCUMENTS

| | | | | |
|---|---|---|---|---|
| 5,482,532 | A * | 1/1996 | Isshiki | B22F 9/082 264/12 |
| 5,827,350 | A * | 10/1998 | Magill | B01D 49/006 261/DIG. 48 |
| 6,610,798 | B1 * | 8/2003 | Bleijenberg | B01F 13/0255 366/101 |
| 6,943,223 | B1 | 9/2005 | Bleijenberg et al. | |
| 2004/0265217 | A1 | 12/2004 | Olbrich et al. | |
| 2007/0151418 | A1 | 7/2007 | Diaz et al. | |
| 2010/0319785 | A1 | 12/2010 | Endmura | |
| 2013/0045421 | A1 | 2/2013 | Kobino et al. | |
| 2015/0217264 | A1* | 8/2015 | Doya | B01J 19/2405 422/187 |

FOREIGN PATENT DOCUMENTS

| | | |
|---|---|---|
| JP | S5771628 A | 5/1982 |
| JP | S62270406 A | 11/1987 |
| JP | H0543920 A | 2/1993 |
| JP | H08315822 A | 11/1996 |
| JP | 2000348724 A | 12/2000 |
| JP | 2004047182 A | 2/2004 |
| JP | 2006228604 A | 8/2006 |
| JP | 2006265086 A | 10/2006 |
| JP | 2007210092 A1 | 8/2007 |
| JP | 20100090411 A | 4/2010 |
| JP | 2011105588 A | 6/2011 |
| WO | WO 2007/129812 A1 | 11/2007 |
| WO | WO 2012/014530 A1 | 2/2012 |

\* cited by examiner

SEM IMAGES WHEN 20 HOURS HAVE PASSED (a)

(b)

(c)

ELEMENT MAPPING (a)

(b)

(c)

SEM IMAGES WHEN 15 HOURS HAVE PASSED (a)

(b)

(c)

ELEMENT MAPPING (a)

(b)

(c)

SEM IMAGES WHEN 2 HOURS HAVE PASSED (a)

(b)

(c)

SEM IMAGES WHEN 6 HOURS HAVE PASSED (a)

(b)

(c)

METHOD OF MANUFACTURING REACTION AGGLOMERATED PARTICLES, METHOD OF MANUFACTURING CATHODE ACTIVE MATERIAL FOR LITHIUM ION BATTERY, METHOD OF MANUFACTURING LITHIUM ION BATTERY, LITHIUM ION BATTERY, AND DEVICE OF MANUFACTURING REACTION AGGLOMERATED PARTICLES

TECHNICAL FIELD

The present invention relates to a method of manufacturing reaction agglomerated particles, a method of manufacturing a cathode active material for a lithium ion battery, a method of manufacturing a lithium ion battery, a lithium ion battery, and a device of manufacturing reaction agglomerated particles.

BACKGROUND ART

A lithium ion battery cathode active material is typically expressed by

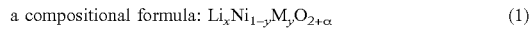

a compositional formula: $Li_xNi_{1-y}M_yO_{2+\alpha}$  (1)

(in the formula, M is one or more selected from Sc, Ti, V, Cr, Mn, Fe, Co, Cu, Zn, Ga, Ge, Al, Bi, Sn, Mg, Ca, B, and Zr, $0.9 \leq x \leq 1.2$, $0 < y \leq 0.7$, and $\alpha > 0.1$).

In addition to the above formula, there is

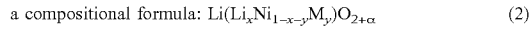

a compositional formula: $Li(Li_xNi_{1-x-y}M_y)O_{2+\alpha}$  (2)

(in the formula, M is one or more selected from Sc, Ti, V, Cr, Mn, Fe, Co, Cu, Zn, Ga, Ge, Al, Bi, Sn, Mg, Ca, B, and Zr, $0 \leq x \leq 0.1$, $0 < y \leq 0.7$, and $\alpha > 0$).

For example, a nickel salt, a cobalt salt, and a manganese salt are reacted as a material with a sodium hydroxide or an ammonium carbonate, and a nickel hydroxide or a manganese carbonate is obtained. The nickel hydroxide or the manganese carbonate is mixed and calcined with lithium (a lithium hydroxide), and a lithium/nickel/manganese-based cathode active material is obtained.

In this sort of case, a method is employed in which a nickel salt solution and a manganese salt solution are injected into a stirred reactor, and a Ni—Mn composite hydroxide or carbonate is precipitated.

CITATION LIST

Patent Literature

Patent Literature 1: JP 2006-228604 A
Patent Literature 2: JP 8-315822 A

SUMMARY OF INVENTION

Technical Problem

However, in a conventional case in which metal agglomerated particles are obtained using crystallization in a stirred reactor, a particle diameter tends to become larger with the lapse of a reaction time, and variation in the particle diameter becomes large after the lapse of a certain time, as a first problem. Therefore, particles having a small and stable diameter cannot be obtained.

A second problem is that the shape of the obtained particles is not always globular, and when the particles are used as a lithium ion battery cathode active material, high performance cannot be expected.

A third problem is that, since it is necessary to employ batch type processing in order to obtain the particles having a small diameter with the sharp distribution thereof, a large processing amount per time cannot be expected. Thus, for increasing the processing amount, investment cost to large facilities is increased.

Therefore, the inventors found out a relatively long reaction path with a small inner diameter for high speed passing, what is called a tube reactor, as an embodiment desirably used for obtaining metal agglomerated particles having a stable particle diameter, obtaining reaction agglomerated particles having a substantially globular shape, and achieving the large amount of processing per unit time with small facilities, without increasing in size of the facilities.

However, when the inventors have repeated experiments in the subsequent development process to find out that since fine shower (primary nuclei) adheres to a wall surface of a flow path of the tube reactor, crystals grow from the primary nuclei and block the flow so that reaction agglomerated particles as a target cannot be obtained in some cases due to the impaired uniformity of reaction.

Therefore, a principal objective of the present invention is to cause single elements or a plurality of element to uniformly react to deposit a crystal, and to prevent adhesion of materials to an inner surface of a flow path to enable a long-time operation.

Another desired objective of the present invention is to obtain reaction agglomerated particles having a small particle diameter with the sharp distribution thereof and a substantially globular shape.

Further, another objective of the present invention is to provide an embodiment capable of performing the large amount of reaction processing per unit time with small facilities, and to provide power-saving facilities, without increasing in size of the facilities.

Solution to Problem

The present invention that solves the problems is as follows.

A method of manufacturing reaction agglomerated particles, the method comprising:
setting a liquid flow in a reaction processing vessel to a spiral flow; and
injecting an additional liquid containing an inorganic substance to be added at a center-side position with respect to an inner surface of the reaction processing vessel in a reaction field in the reaction processing vessel so as to perform reaction processing.

(Operation and Effect)

FIG. 16 illustrates a conventional example in which a liquid concentrate A containing a reactant, a liquid concentrate B containing a reactant, and a gas C are added into a stirred reactor 1, and are stirred with a stirring blade 3 with a stirring motor 2, agglomeration and sedimentation of particles are facilitated, and a product liquid is discharged through a discharge outlet 5 at appropriate timing, and precursor particles are then obtained by filtration, washing, and drying, for example.

The obtained metal agglomerated particles are mixed with lithium (for example, lithium hydroxide), subjected to calcination, cracking, and classification processes, and can be used as a lithium ion battery cathode active material and the like.

This type of conventional example causes the above-described first, second, and third problems.

Therefore, the inventors attempted to use the tube reactor as described above, but found out that since the fine shower (primary nuclei) adheres to the wall surface of the flow path of the tube reactor, the crystals grow from the primary nuclei and block the flow, which makes in some cases it difficult to perform a long-time stable operation.

In order to handle these cases, a measure can be considered as follows, reaction paths are arranged in parallel, and if a blockage has occurred, the reaction path is switched to the other reaction path, and circulation is performed while the reaction path in which the blockage has occurred is cleaned.

However, even in such short switching, variation in particle diameters due to a discontinuous operation in the reaction field should be avoided, and thus a process is required, which is tolerable for a stable operation for a long time.

Then, it has been found out that the above problems can be solved according to the present invention, by setting the liquid flow in the reaction processing vessel to the spiral flow; and injecting the additional liquid containing the inorganic substance to be added at the center-side position with respect to the inner surface of the reaction processing vessel in the reaction field in the reaction processing vessel so as to perform the reaction processing.

In the reaction field that exhibits the spiral flow as the liquid flow, flow in a swirl portion in the center or in an inner peripheral portion in the vicinity of a void portion in the center, like a whirlwind, is considerably fast, such as at least twice as fast as the average flow velocity, with large turbulence. This portion becomes a rapid diffusion field of the injected additional liquid containing the inorganic substance, which enables a uniform reaction.

Further, an outer peripheral portion of the spiral flow is in contact with the wall surface of the flow path, and thus the outer peripheral portion of the spiral flow functions as a barrier against a reactant of the injected additional liquid containing the inorganic substance. Therefore, adhesion of the reactant to the inner surface of the flow path may be prevented so as to enable a stable operation for a long time.

The method of manufacturing reaction agglomerated particles, further comprising:

circulating the liquid for the reaction processing vessel; and introducing a returned liquid of the circulated liquid into the reaction processing vessel so as to generate the spiral flow.

(Operation and Effect)

In generating the reaction field, various types of liquids including the additional liquid containing the inorganic substance to be added are injected for example, in a tangent direction to an inner wall surface of the vessel so as to set the liquid flow in the reaction processing vessel to the spiral flow used as the reaction field.

If reactivity of the injected substance is high, the reaction promptly advances soon after the contact by the additional liquid containing the inorganic substance to be added into the mother liquid. In this case, even if the outer peripheral portion of the spiral flow is in contact with the wall surface of the flow path according to the present invention, the outer peripheral portion of the spiral flow cannot be expected to function as the barrier against the reactant of the injected additional liquid containing the inorganic substance.

Therefore, it is difficult to prevent the adhesion of the reactant to the inner surface of the flow path.

Further, for the continuous reaction processing, it is preferable that the additional liquid containing the inorganic substance to be added is injected while the liquid is circulated and the reaction processing liquid is discharged from the circulation path.

Therefore, in order to prevent the adhesion of the reactant to the inner surface of the flow path, it is preferable that the liquid is circulated for the reaction processing vessel, and the returned liquid of the circulated liquid is introduced into the reaction processing vessel so as to generate the spiral flow.

The method of manufacturing reaction agglomerated particles, wherein the returned liquid is introduced into the reaction processing vessel along an inner peripheral surface of the reaction processing vessel to generate the spiral flow.

(Operation and Effect)

By introducing the returned liquid into the reaction processing vessel along the inner peripheral surface of the reaction processing vessel, the desirable spiral flow can be easily generated.

The method of manufacturing reaction agglomerated particles, wherein an inflow velocity of the returned liquid introduced into the reaction processing vessel is 0.5 m/sec or more.

(Operation and Effect)

If the inflow velocity (inflow average velocity) of the returned liquid introduced into the reaction processing vessel is 0.5 m/sec or more, the spiral flow can be reliably generated. By doing so, diffusion of the substance is improved in the reaction field so that each secondary particle generated by bonding the primary particles can be prevented from enlarging due to the increased shear energy in the flow.

The method of manufacturing reaction agglomerated particles, wherein the liquid having passed through the reaction field is extracted from the reaction processing vessel at an outflow velocity of 0.5 m/sec or more.

(Operation and Effect)

If the outflow velocity (outflow average velocity) of the liquid extracted from the reaction processing vessel is 0.5 m/sec or more, the spiral flow can be reliably generated to an outflow portion of the liquid. Further, if the outflow velocity is lower than 0.5 m/sec, adhesion of materials to the wall surface is increased to a great degree in a downstream portion.

The method of manufacturing reaction agglomerated particles, wherein an inflow position of a returned liquid of a circulated liquid introduced into the reaction processing vessel is one end portion of the reaction processing vessel in a longitudinal direction, and a liquid after the reaction processing is extracted from another end portion of the reaction processing vessel in the longitudinal direction so as to be returned to the reaction processing vessel as the returned liquid of the circulated liquid.

(Operation and Effect)

In the reaction processing vessel, it is desirable to secure a certain long space along the longitudinal direction in order to have the enough length of the reaction field for the spiral flow. Therefore, it is preferable that the liquid is introduced into the reaction processing vessel from the one end portion of the reaction processing vessel in the longitudinal direction while the liquid is extracted from the other end portion in the longitudinal direction so as to be returned to the reaction processing vessel.

The method of manufacturing reaction agglomerated particles, wherein an inflow position of a returned liquid introduced into the reaction processing vessel is one end portion of the reaction processing vessel in a longitudinal direction, an outflow position of a liquid extracted from the reaction processing vessel after the reaction processing is another end portion of the reaction processing vessel in the longitudinal direction, and a final reaction processing liquid is discharged from an upstream side with respect to an injection portion of the additional liquid injected into the reaction processing vessel.

(Operation and Effect)

By discharging the final reaction processing liquid from the upstream side with respect to the injection portion of the additional liquid injected into the reaction processing vessel, the final reaction processing liquid can be discharged without any influence from the field for the spiral flow.

The method of manufacturing reaction agglomerated particles, wherein an inner surface of the reaction processing vessel is tapered from one end portion to another end portion in a longitudinal direction, an inflow position of a returned liquid of a circulated liquid is the one end portion of the reaction processing vessel in a longitudinal direction, and an outflow position of a liquid extracted from the reaction processing vessel after the reaction processing is another end portion of the reaction processing vessel in the longitudinal direction.

(Operation and Effect)

The reaction processing vessel may have a cylindrical shape with a uniform radius of an inner space. However, a reaction processing vessel having the inner surface that is tapered from the one end portion to the other end portion in the longitudinal direction is favorable for generating the spiral flow.

The method of manufacturing reaction agglomerated particles, wherein the reaction processing vessels that provide the reaction fields are arranged in series.

(Operation and Effect)

In order to increase a processing amount, it is desirable to arrange the reaction processing vessels in series.

This arrangement in the series enables to increase the amount of the additional liquid by an amount corresponding to the number of stages without increasing the amount of the returned liquid of the circulated liquid. Accordingly, the amount of production can be increased and the internal volume of facilities can be decreased considering the amount of production. As a result, it is possible to save a space and to reduce cost for the facilities. Here, the expression "the internal volume of facilities can be decreased considering the amount of production" means as follows. An increased volume is caused only by the reaction processing vessels and pipes connecting the vessels while a circulation pump and flow path have constant volume, because any additional circulation pump or any additional flow path is not necessary. Therefore, the entire volume of the facilities can be decreased considering the amount of production. Further, since "the internal volume of facilities can be decreased," there is another effect that a retention time of the reactant in the vessel can be decreased, resulting in that the retention time can be controlled for decreasing the particle diameters.

The method of manufacturing reaction agglomerated particles, wherein the reaction processing vessels that provide the reaction fields are arranged in parallel.

(Operation and Effect)

The reaction processing vessels can be arranged in parallel when the processing amount is increased or the like.

Especially, when the same reaction processing vessels are arranged in parallel, the processing amount, which is based on a uniform reaction process performed in each vessel, can be increased. On the other hand, when the reaction processing vessels are arranged in series, a pressure gradient is generated over a flow direction. Thus, if a uniform reaction process is required in each vessel, the parallel arrangement is favorable.

The method of manufacturing reaction agglomerated particles, wherein the additional liquid containing the inorganic substance to be added is injected toward the reaction field in a downstream direction of the spiral flow of the liquid.

(Operation and Effect)

As described after, the additional liquid containing the inorganic substance to be added may be injected in the upstream direction of the spiral flow of the liquid toward the reaction field. However, when the additional liquid containing the inorganic substance to be added is injected toward the reaction field in the downstream direction of the spiral flow of the liquid, the amount of adhered materials to the inner surface can be decreased.

The method of manufacturing reaction agglomerated particles, wherein the additional liquid containing the inorganic substance to be added is injected toward the reaction field in an upstream direction of the spiral flow of the liquid.

(Operation and Effect)

Even if the additional liquid containing the inorganic substance to be added is injected in the upstream direction of the spiral flow of the liquid toward the reaction field, a case may be caused where the amount of adhered materials to the inner surface is practically acceptable.

The method of manufacturing reaction agglomerated particles, comprising circulating the liquid for the reaction processing vessel, wherein midway in the circulating, an external reactor is provided, which has a stirring blade and a different structure from that of the reaction processing vessel, a part of a final reaction processing liquid is extracted outside from the reaction processing vessel so as to be sent to the external reactor where a reaction liquid is produced through a reaction, and the reaction liquid is returned to the reaction processing vessel.

(Operation and Effect)

In this method, the part of the reaction processing discharged from the reaction processing vessel is reacted again in the external reactor. Therefore, it is possible to have the long retention time and to decrease particles having small diameters. In this embodiment, it is noticeable that the liquid containing a crystalline component is injected into the reaction processing vessel from the external reactor together with the additional liquid containing the inorganic substance to be added. Also in the invention described in the claims, an embodiment can be included where a crystalline component is injected together with the additional liquid containing the inorganic substance to be added.

The method of manufacturing reaction agglomerated particles, comprising circulating the liquid for the reaction processing vessel, wherein midway in the circulating, two external tanks are provided in series, a downstream-side external tank is an external sedimentation separation tank, to which the additional liquid is not injected, and in which sedimentation and separation are performed, and only a group of fine particles in an upper portion of the external sedimentation separation tank is returned to the reaction processing vessel.

(Operation and Effect)

Since crystals in the returned liquid function as seed crystals in a similar way as described in the foregoing paragrah, the particle size distribution in the reaction processing vessel 10 can be adjusted. An upstream-side external tank can be used as a buffer tank or a reactor.

The method of manufacturing reaction agglomerated particles, comprising circulating the liquid for the reaction processing vessel, wherein midway in the circulating, an external sedimentation separation tank, to which the additional liquid is not injected, and in which sedimentation and separation are performed, and only a group of fine particles in an upper portion of the external sedimentation separation tank is returned to the reaction processing vessel.

(Operation and Effect)

Since crystals in the returned liquid function as seed crystals, the particle size distribution in the reaction processing vessel can be adjusted.

The method of manufacturing reaction agglomerated particles, wherein a pump is used as a unit for introducing the circulated liquid to the reaction processing vessel.

(Operation and Effect)

Since the inflow velocity to the reaction processing vessel is controlled through the means of the pump, an arbitrary reaction field can be generated.

A method of manufacturing a cathode active material for a lithium ion battery, using the reaction agglomerated particles obtained by the manufacturing method of the present invention.

A method of manufacturing a lithium ion battery containing a cathode active material for a lithium ion battery, using the reaction agglomerated particles obtained by the manufacturing method of the present invention.

A lithium ion battery containing a cathode active material for a lithium ion battery, using the reaction agglomerated particles obtained by the manufacturing method of the present invention.

A device of manufacturing reaction agglomerated particles, comprising:

a reaction processing vessel having an inflow portion provided at one end portion of the reaction processing vessel in a longitudinal direction for a returned liquid of a circulation returned liquid, and an outflow portion provided at another end portion of the reaction processing vessel in the longitudinal direction for a liquid extracted from the reaction processing vessel after the reaction processing; and a reaction field provided, so as to generate spiral flow between the inflow portion and the outflow portion in the reaction processing vessel by the returned liquid of the circulated liquid introduced to the reaction processing vessel, wherein an additional liquid containing an inorganic substance to be added is injected at a center-side position with respect to an inner surface of the reaction processing vessel so as to perform reaction processing.

(Operation and Effect)

Operations and effects are obtained which are similar to those described above.

Advantageous Effects of Invention

According to the present invention, the amount of the adhered materials to the inner surface of the flow path can be prevented so as to enable the stable operation for a long time.

Further, the reaction agglomerated particles having a small particle diameter with the sharp distribution thereof and a substantially globular shape can be obtained. In addition, the large amount of reaction processing per unit time can be achieved with small facilities without increasing in size of the facilities.

DESCRIPTION OF EMBODIMENTS

Next, embodiments for implementing the present invention will be described.

Figure 16:
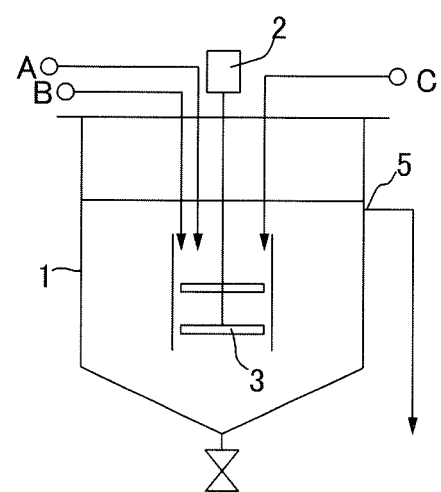
FIG. 16 is the schematic diagram of a conventional example.

FIG. 16 illustrates the conventional example in which the liquid concentrate A containing the reactant, the liquid concentrate B containing the reactant, and the gas C are added into the stirred reactor 1, and are stirred with the stirring blade 3 with the stirring motor 2, the crystallization and agglomeration of the particles are facilitated, and the product liquid is discharged through the discharge outlet 5 at appropriate timing, and the precursor particles are then obtained by the filtration, the washing, and the drying, for example.

The obtained metal agglomerated particles are mixed with lithium (for example, lithium hydroxide), subjected to the calcination, the cracking, and the classification processes, and can be used as the lithium ion battery cathode active material and the like.

The present invention is intended for a reactant used in manufacturing a cathode active material for a lithium ion battery, for example. As specific examples, the present invention is directly intended for manufacturing agglomerated particles using transition metals such as Ni, Co, and Mn. Further, the present invention may be intended for other metals than the above-described transition metals and for other inorganic substances, because the method where an additional liquid containing an inorganic substance to be added is injected at a center-side position with respect to an inner surface of a reaction processing vessel, and reaction processing is performed in a reaction field of spiral flow in the reaction processing vessel according to the present invention can be widely and typically applied to the case where agglomerated particles are obtained with an inorganic substance.

Hereinafter, description intended for a reactant mainly used in manufacturing a cathode active material for a lithium ion battery will be given.

FIGS. 1 to 4 illustrate the first example of the present invention. Liquid flow in a reaction processing vessel 10 is set to be spiral flow, an additional liquid containing an inorganic substance to be added is injected at a center-side position with respect to an inner surface of the reaction processing vessel 10 in a reaction field (conceptually illustrated with the reference sign Q in FIG. 4) in the reaction processing vessel 10 for performing reaction processing.

In the illustrated example, as the additional liquid containing the inorganic substances to be added, the liquid A, the liquid B, and the liquid C are injected. Although not illustrated, a gas D (an inert gas such as a nitrogen gas or a carbon dioxide gas) can be injected together in parallel.

Further, in the first example of the present invention, the additional liquid containing the inorganic substances to be added is injected toward the reaction field in the downstream direction of the spiral flow of the liquid.

In the drawing, the reaction processing vessel 10 is vertically arranged, but the reaction processing vessel 10 may be horizontally arranged because there is no effect on the flow in principle.

In the illustrated reaction processing vessel 10, a liquid is circulated through circulation paths 11 and 14 with a circulation pump 13 and a returned liquid of the circulated liquid is introduced into the reaction processing vessel 10 so as to generate the spiral flow. Reference numeral 15 is designated as a temperature regulator 15 used in heating or cooling the liquid.

Figure 3:
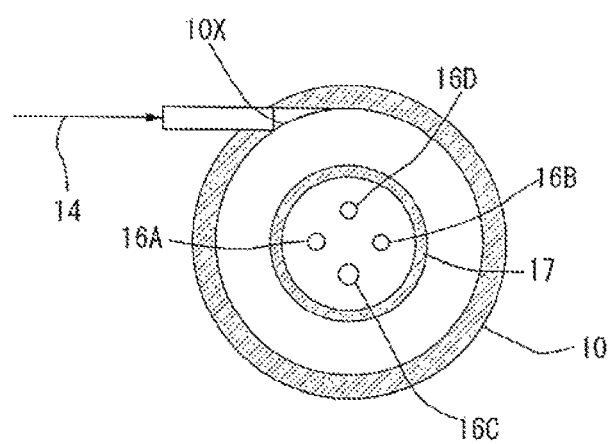
FIG. 3 is the traverse cross-sectional view of the upper end portion of a reaction processing vessel.
Figure 4:
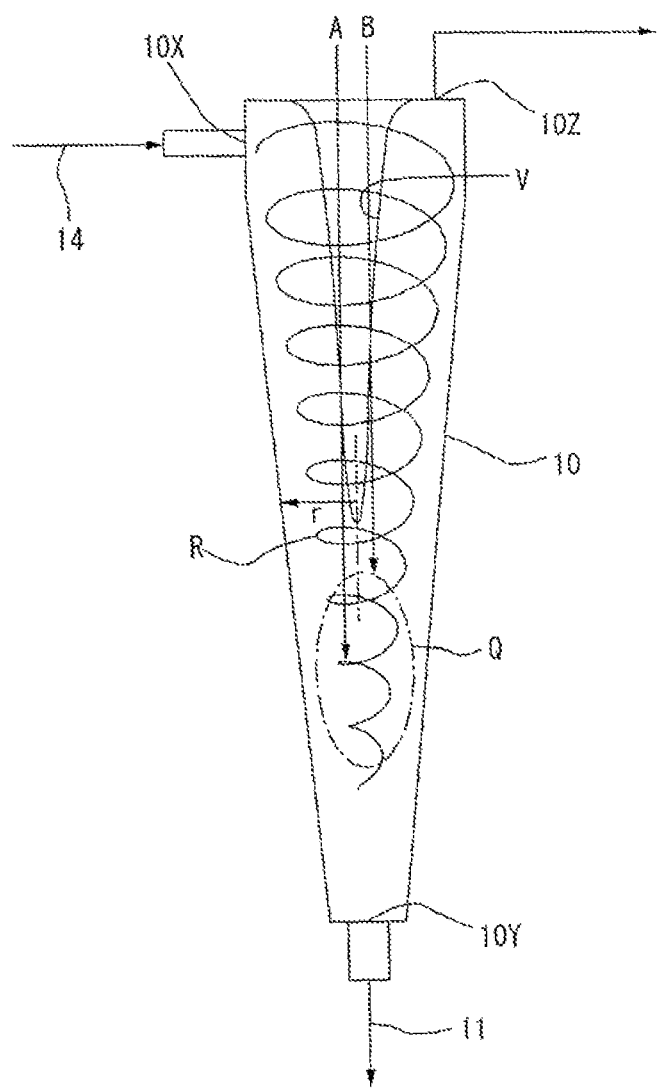
FIG. 4 is the explanatory schematic diagram of an embodiment where spiral flow is generated.

As illustrated in the drawing, the inner surface of the reaction processing vessel 10 is tapered from the one end portion to the other end portion in the longitudinal direction. An inflow position including an inflow port 10X of the returned liquid of the circulated liquid is provided at the one end portion of the reaction processing vessel 10 in the longitudinal direction. As illustrated in FIG. 3, the returned liquid is introduced into the reaction processing vessel 10 almost in the tangent direction to an inner peripheral surface of the reaction processing vessel 10, whereby the spiral flow R is generated.

An outflow position including an outflow port 10Y of the liquid extracted from the reaction processing vessel after the reaction processing is the other end portion of the reaction processing vessel in the longitudinal direction Further, a final reaction processing liquid is discharged from the reaction processing vessel 10 through an overflow port 10Z at the one end portion in the longitudinal direction.

While the liquid flow in the reaction processing vessel 10 is the spiral flow R, a void portion V tends to be formed in an upper center of the flow and a central portion of the swirl. Especially, the flow velocity in an inner peripheral portion in the vicinity of the center of the swirl of the spiral flow R is considerably higher than an average flow velocity, and turbulence of the flow is large.

Accordingly, by injecting from such position, the liquid A to C, as the additional liquid containing metals to be added, into the vessel, the additional liquid is rapidly diffused so as to achieve a uniform reaction.

In this case, it is desirable to provide injection tubes 16A, 16B, . . . through which the liquid A to C are passed so as not to contact mutually until they are ejected from leading tips of injection tubes 16A, 16B, . . . , respectively.

Further, it is desirable to insert a guide tube 17 so as not to effect on these liquids from the spiral flow R.

Although it is sufficient that the injection position of the liquid A to C as the additional liquid containing the inorganic substance to be added is a center-side position with respect to an inner wall surface of the reaction processing vessel 10 in the reaction field in the reaction processing vessel 10, the injection position is favorably located within ⅔ of a radius r from the center, more favorably within ½ of the radius r.

The final reaction processing liquid is discharged through the overflow port 10Z, and is sent to a storage vessel 20 through a discharge path 19. At appropriate timing, a discharge valve 21 is opened, and an agglomerated particle liquid is discharged from the bottom of the storage vessel so as to be sent to a final producing step by means of a discharge pump 22. The reference numeral 23 is designated as a stirred reactor.

Figure 5:
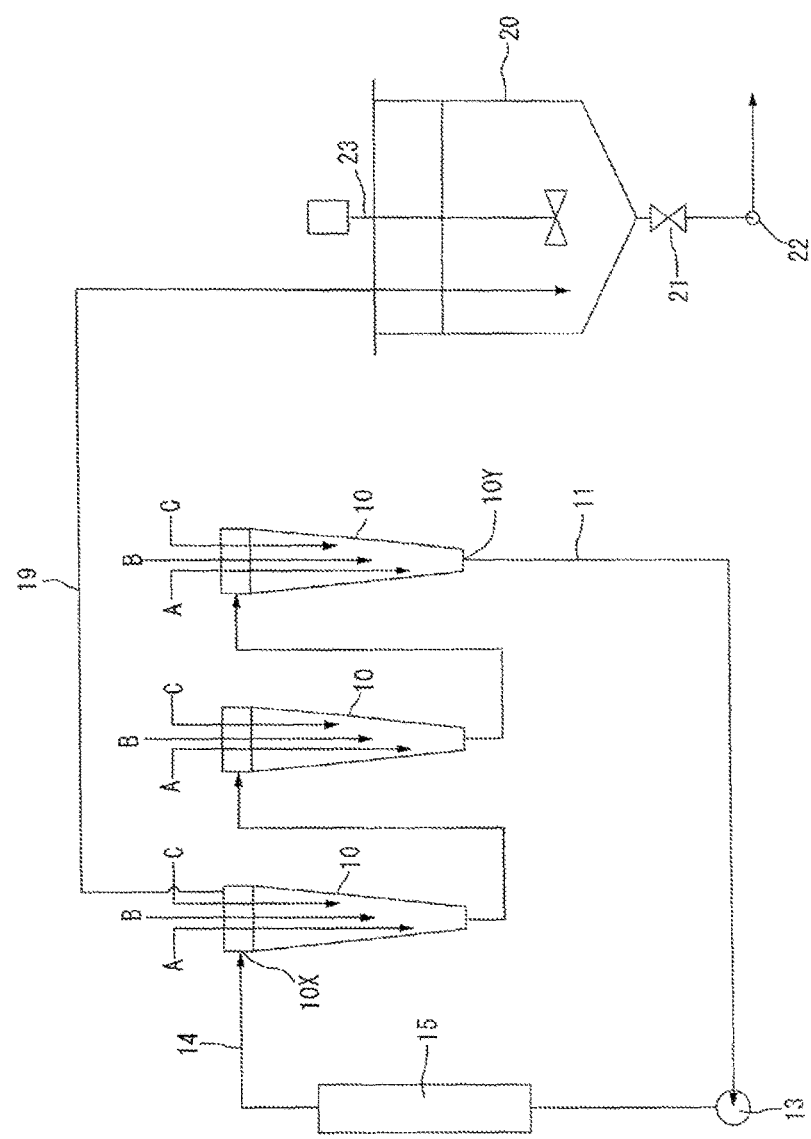
FIG. 5 is the schematic diagram of an example where reaction processing vessels are arranged in series.

As exemplarily illustrated in FIG. 5, the reaction processing vessels 10, 10, . . . that provide the reaction field can be arranged in series.

In this case, overflow in the reaction processing vessel 10 in the first stage is sent to the storage vessel 20 while a liquid extracted from the reaction processing vessel 10 in the final stage can be circulated into the reaction processing vessel 10 in the first stage.

Figure 6:
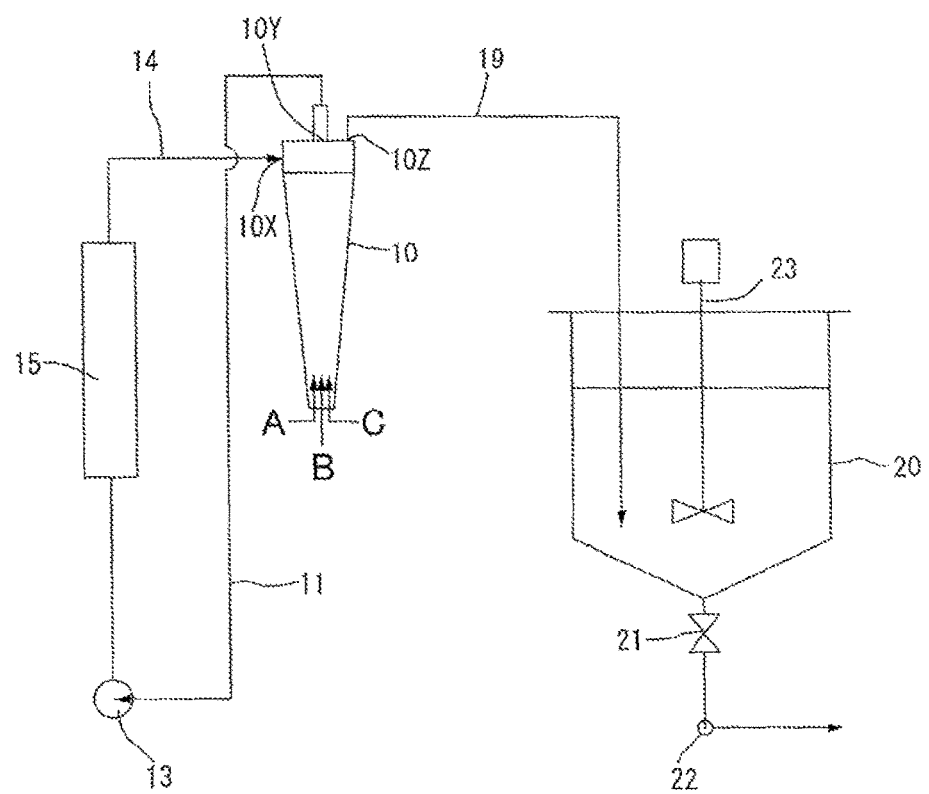
FIG. 6 is the schematic diagram of an example of the injection in the upward direction.

On the other hand, as exemplarily illustrated in FIG. 6, the liquid A to C as the additional liquid containing metals to be added can be injected toward the reaction field in the reaction processing vessel 10 in the direction from a lower portion to an upper portion. That is, in the example of FIG.

6, the additional liquid containing inorganic substances to be added is injected in the upstream direction of the spiral flow of the liquid toward the reaction field. In this case, a liquid extracted from the upper portion is circulated, and a liquid discharged from the upper portion is sent to the storage vessel 20 through the discharge path 19.

Figure 7:
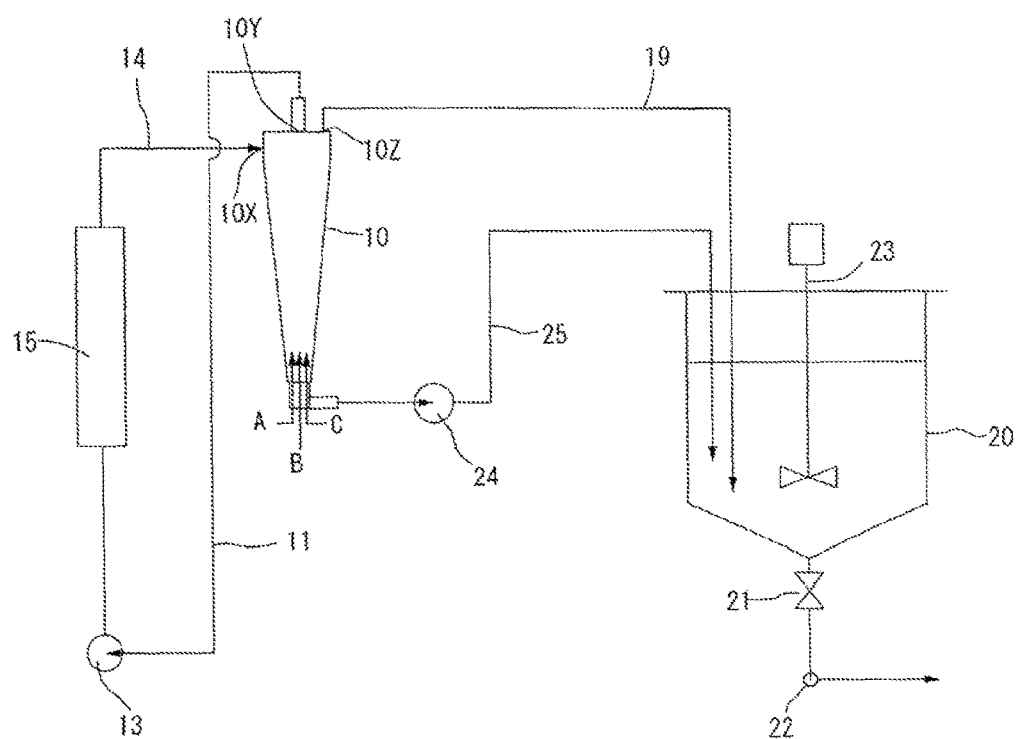
FIG. 7 is the schematic diagram of another example of the injection in the upward direction.
Figure 8:
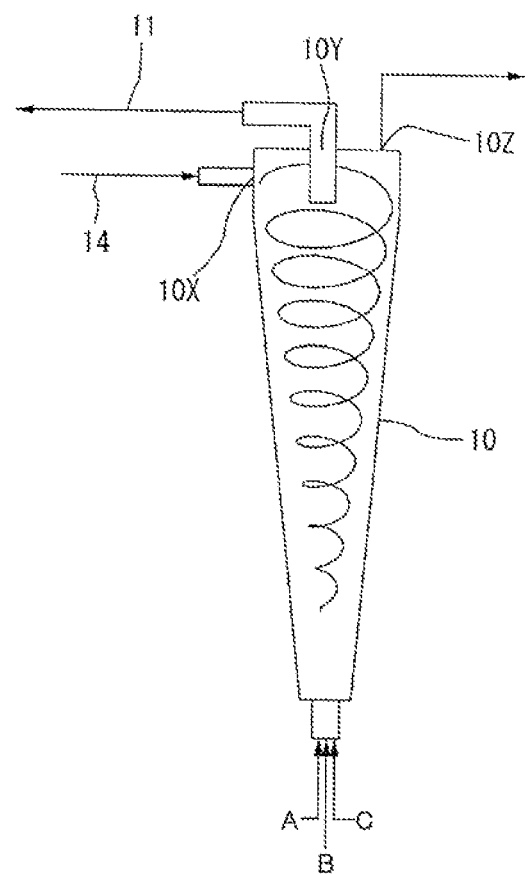
FIG. 8 is the explanatory schematic diagram of an embodiment where spiral flow is generated.

Meanwhile, as illustrated in FIG. 7, the liquid may be discharged from the lower portion of the reaction processing vessel 10 by means of the extraction pump 24 so as to be sent to the storage vessel 20 through the discharge path 25.

The inventors originally expected that the injection of the liquid A to C as the additional liquid containing metals to be added from the lower portion to the upper portion exhibits a favorable diffusion reaction, because the liquid A to C are injected as the additional liquid so as to be in contact countercurrently with the downward spiral flow. However, adhesion of materials to the inner wall surface of the flow path may be observed in some cases, and thus this embodiment cannot be so suitable.

Figure 9:
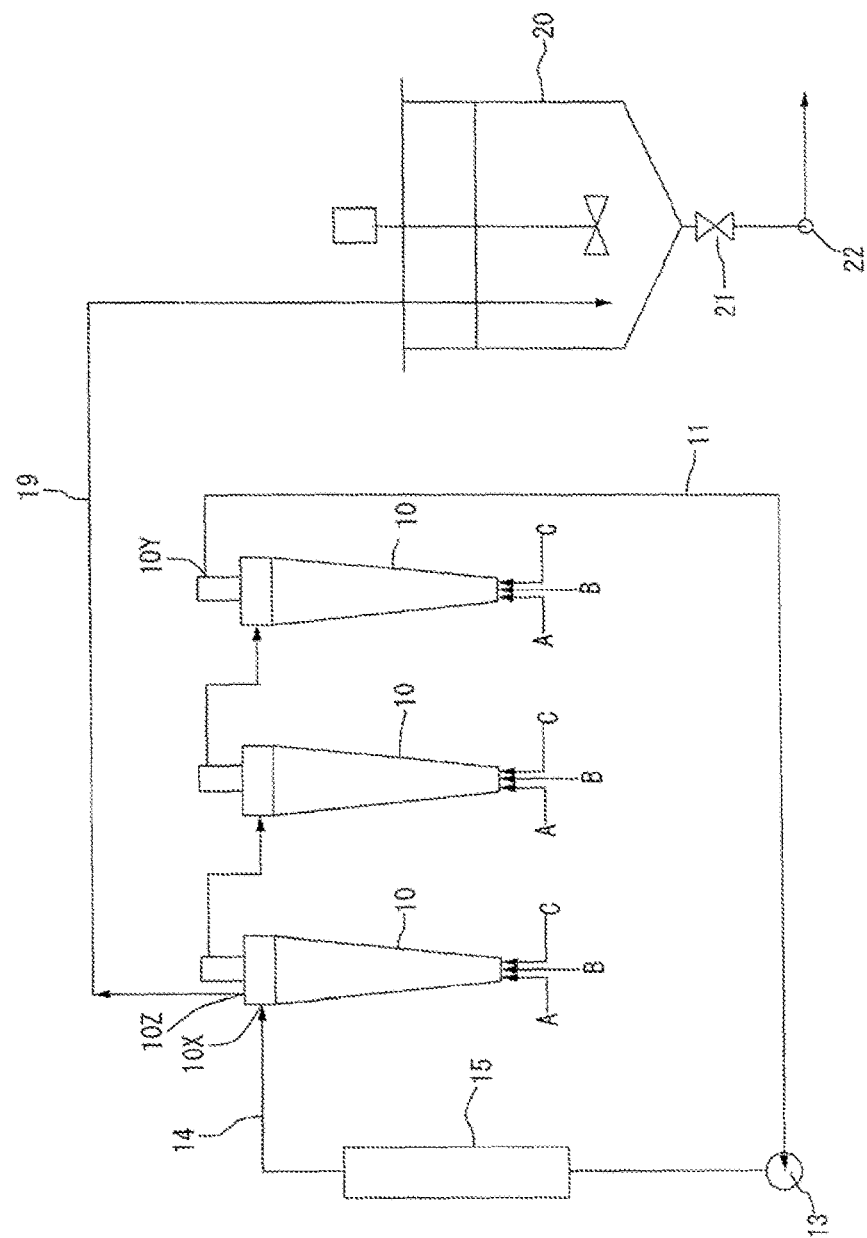
FIG. 9 is the schematic diagram of an example where reaction processing vessels are arranged in series.

As exemplarily illustrated in FIG. 9, the reaction processing vessels 10, 10, . . . that provide the reaction field can be arranged in series, even in the embodiment where the liquid A to C as the additional liquid containing metals to be added are injected from the lower portion to the upper portion.

Although not shown, the reaction processing vessels 10, 10, . . . that provide the reaction field can be arranged in parallel.

The reaction processing vessel having the inner surface tapered from the one end portion to the other end portion in the longitudinal direction is favorable for generating the spiral flow. However, the reaction processing vessel may have a cylindrical shape with a uniform radius of an inner space.

Figure 10:
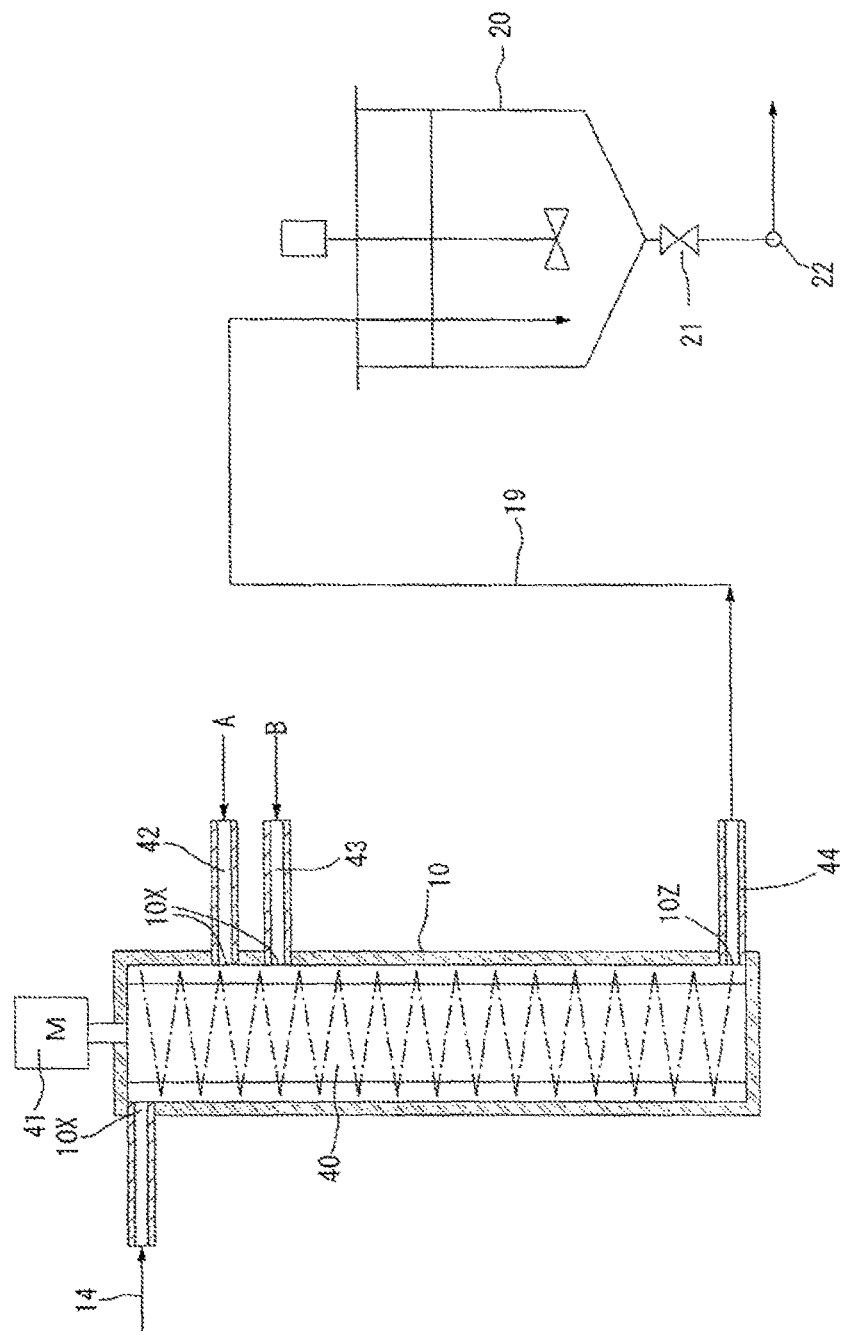
FIG. 10 is the schematic diagram of another example of a reaction processing vessel.

Further, as illustrated in FIG. 10, a rotary barrel 40 is arranged in the reaction processing vessel 10 so as to be rotated by means of a motor 41. The liquid A to C as the additional liquid containing metals to be added are injected in the tangent direction to the inner wall surface through injection tubes 42 and 43, and the liquid after the reaction processing can be discharged through a discharge tube 44 provided in the other end portion.

In this case, the rotary barrel 40 may be rotated as required in order to facilitate the spiral flow.

Figure 11:
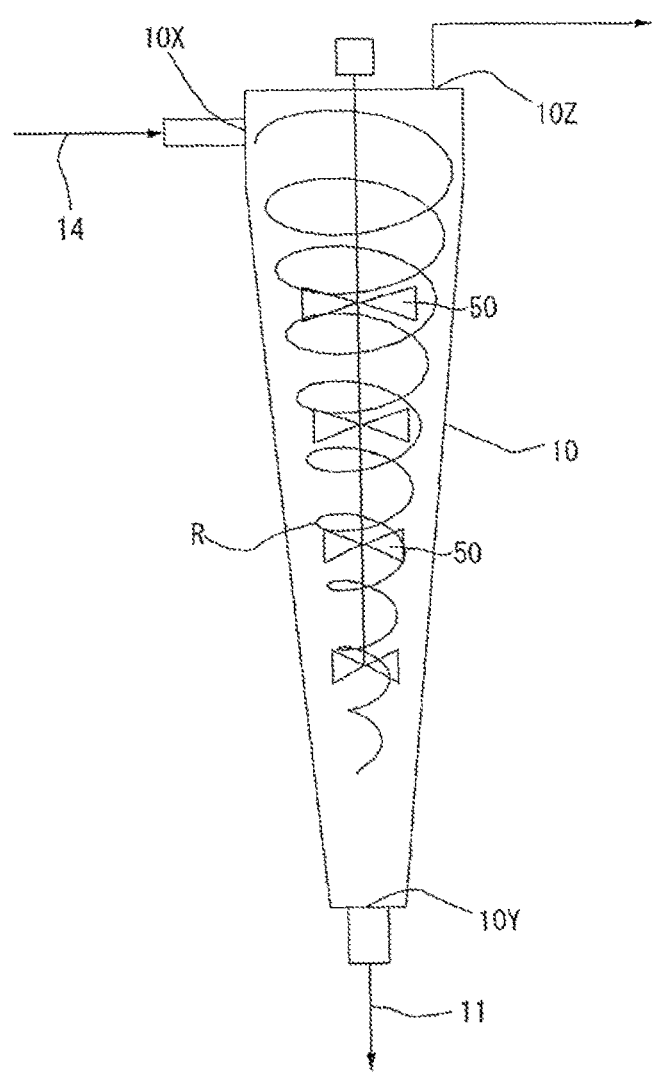
FIG. 11 is the schematic diagram of further another example of a reaction processing vessel.

The spiral flow can be generated by rotating a plurality of stirring blades 50, 50, . . . , which are arranged with spaces therebetween, as illustrated in FIG. 11.

Figure 12:
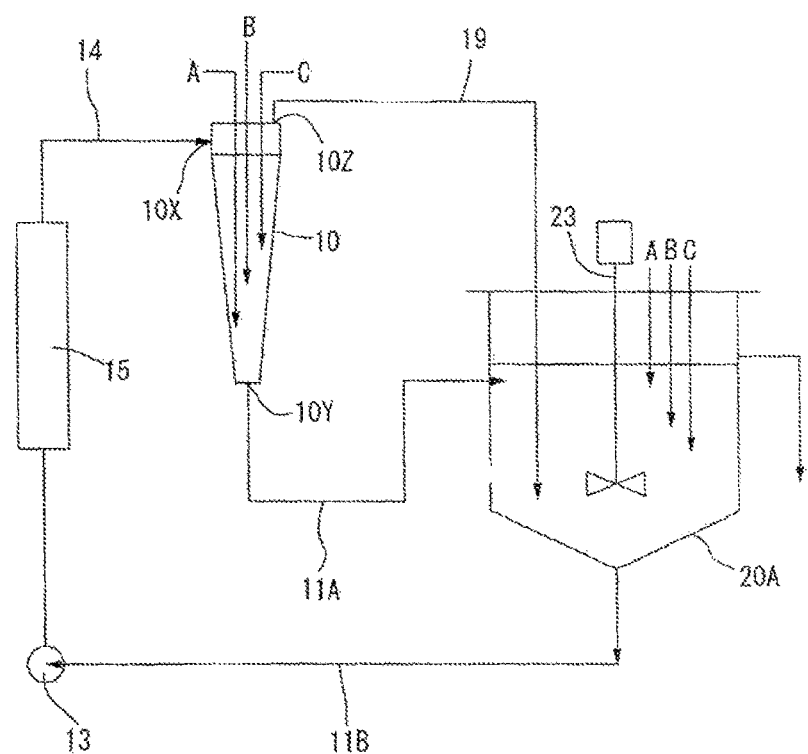
FIG. 12 is the schematic diagram of another embodiment example.

Meanwhile, the embodiment of FIG. 12 according to the invention described in the claims can be employed. That is, the liquid is circulated for the reaction processing vessel 10 through circulation paths 11A and 11B, and midway in the circulating, an external continuous stirred tank reactor 20A, which has a stirring blade and a different structure from that of the reaction processing vessel 10, is provided. A part of a final reaction processing liquid is extracted outside from the reaction processing vessel 10 so as to be sent through the circulation path 11A to the external reactor 20A to which the liquid A to C as the additional liquid are injected so as to produce a reaction liquid, and the reaction liquid is circulated for the reaction processing vessel 10.

By doing so, the reaction processing liquid discharged from the reaction processing vessel 10 is reacted again in the external reactor 20A. Therefore, it is possible to have the long retention time and to decrease particles having small diameters.

Figure 13:
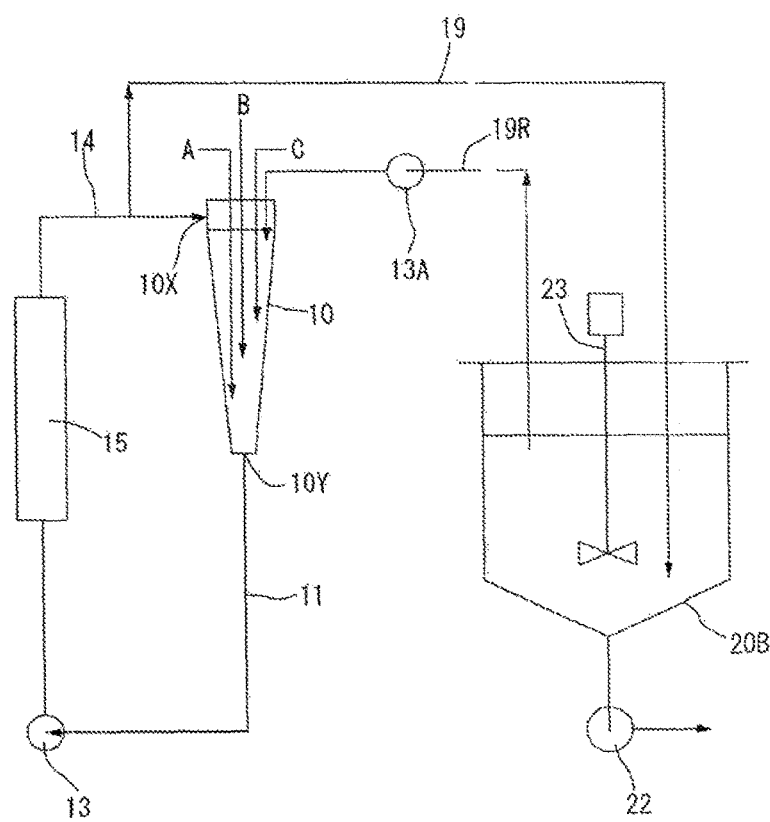
FIG. 13 is the schematic diagram of further another embodiment example.

Further, the embodiment of FIG. 13 according to the invention described in the claims can be employed. That is, in place of the external reactor 20A, an external sedimentation separation tank 20B may be used, to which the liquid A to C as the additional liquid is not injected.

In this case where the external sedimentation separation tank 20B is used, it is possible that the separation and sedimentation are performed in the external tank 20B and it is also possible to return only a group of fine particles in an upper portion of the external tank to the reaction processing vessel 10 through the return path 19R with the return pump 13A. Further, since crystals in the returned liquid are functioned as seed crystals, the particle size distribution in the reaction processing vessel 10 can be adjusted.

In the embodiment of FIG. 13, the tank 20B is the sedimentation separation tank. However, the tank 20B may be used as a buffer tank for adjusting the amount of circulated liquid in relation to the amount of liquid discharged outside by means of the discharge pump 22. In addition, in a similar way as in the embodiment of FIG. 12, the liquid A to C or one or two thereof as necessary as the additional liquid can be injected into the tank 20B so as to produce a reaction liquid and the reaction liquid can be returned to the reaction processing vessel 10 through the return path 19R.

Figure 14:
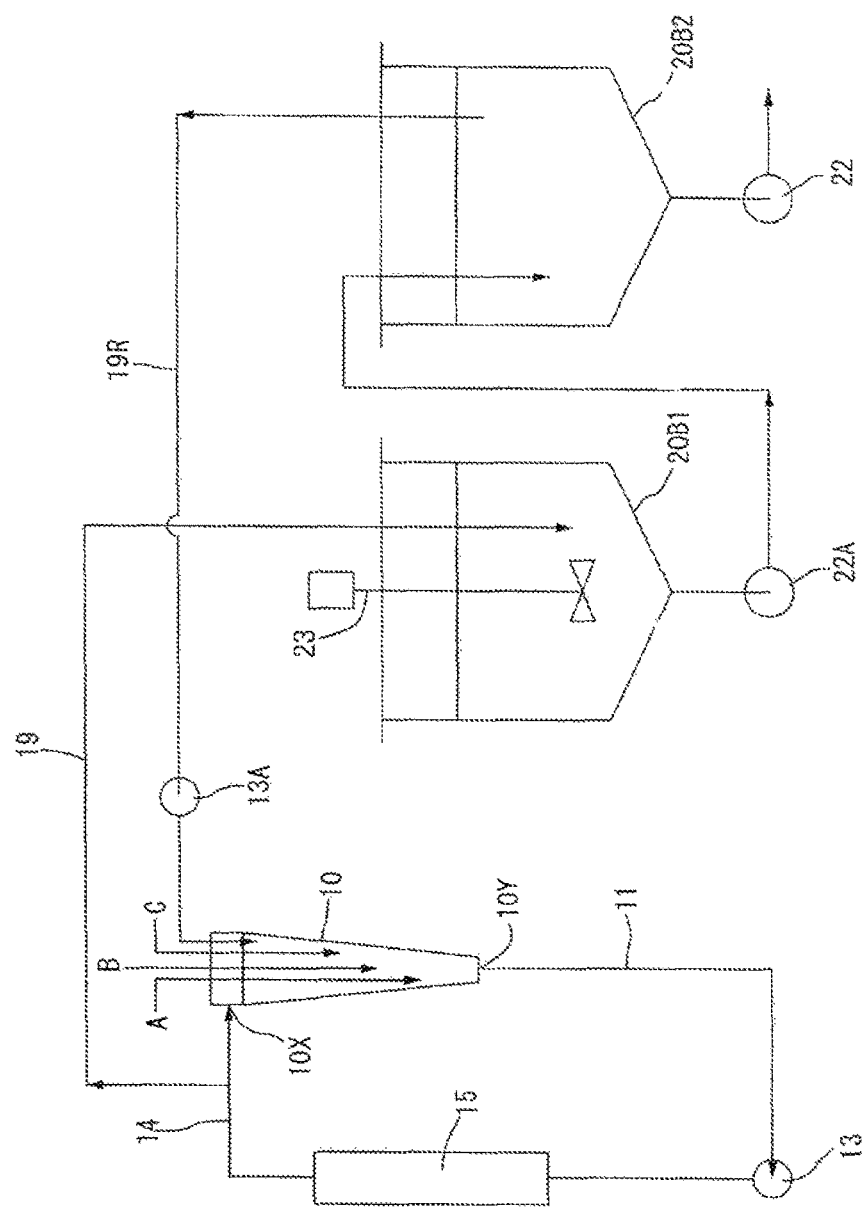
FIG. 14 is the schematic diagram of still further another embodiment example.

Meanwhile, based on the embodiments illustrated in FIGS. 12 and 13, the embodiment of FIG. 14 according to the invention of the claims can be employed. That is, two external tanks 20B1, 20B2 are provided and the external tank 20B1 is used as a buffer tank from which, a liquid is sent to the external tank 20B2 as a sedimentation separation tank by means of a transfer pump 22A. Then, in the external tank 20B2, sedimentation and separation are performed. In this embodiment, only a group of fine particles in an upper portion of the external tank 20B2 can be returned to the reaction processing vessel 10 through the return path 19R by means of the return pump 13A. Further, the particle size distribution in the reaction processing vessel 10 can be adjusted by crystals in the returned liquid functioned as seed crystals.

In this embodiment, after the liquid A to C as the additional liquid are injected into one or both of the external tanks 20B1 and 20B2 so as to produce a reaction liquid, the reaction liquid can be returned to the reaction processing vessel 10 through the return path 19R with the return pump 13A.

Figure 1:
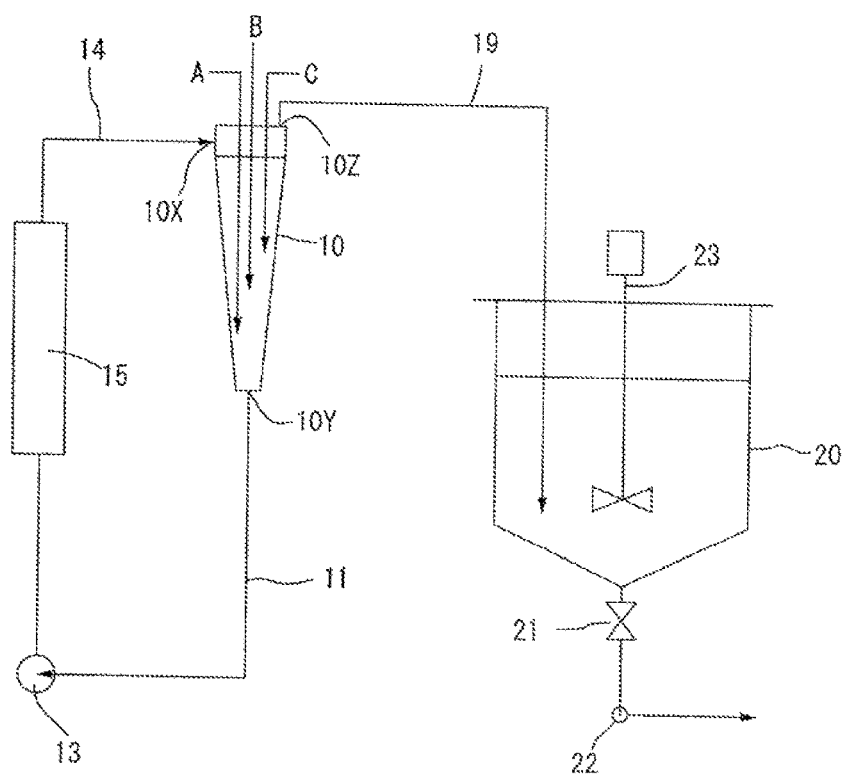
FIG. 1 is the schematic diagram of the first example of the present invention.
Figure 2:
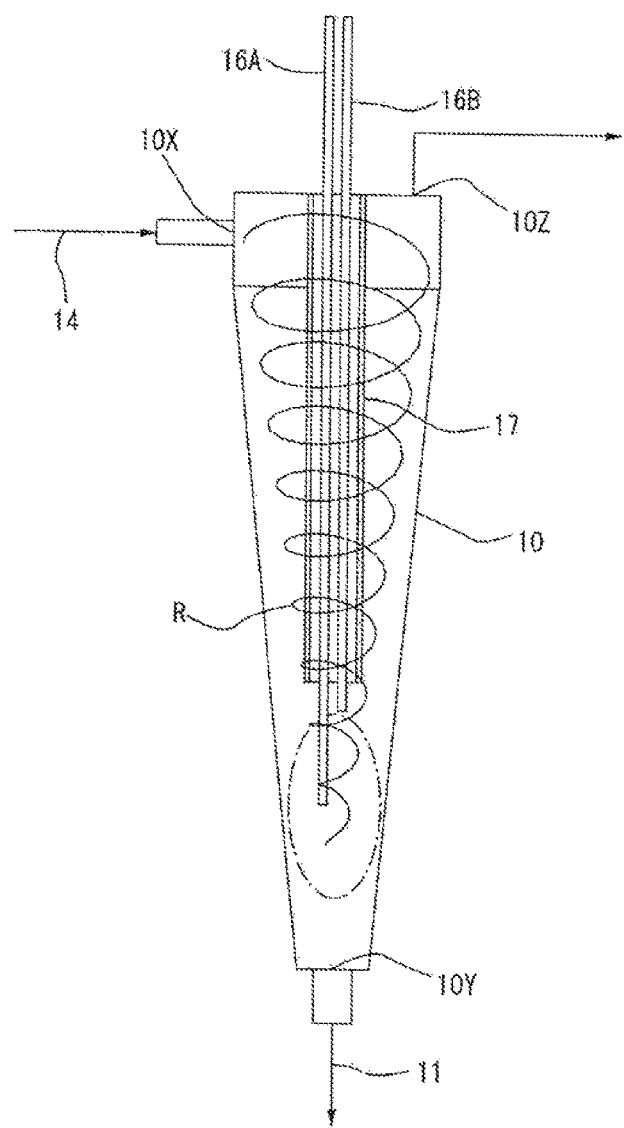
FIG. 2 is the schematic diagram of the reaction processing vessel of the first example.
Figure 15:
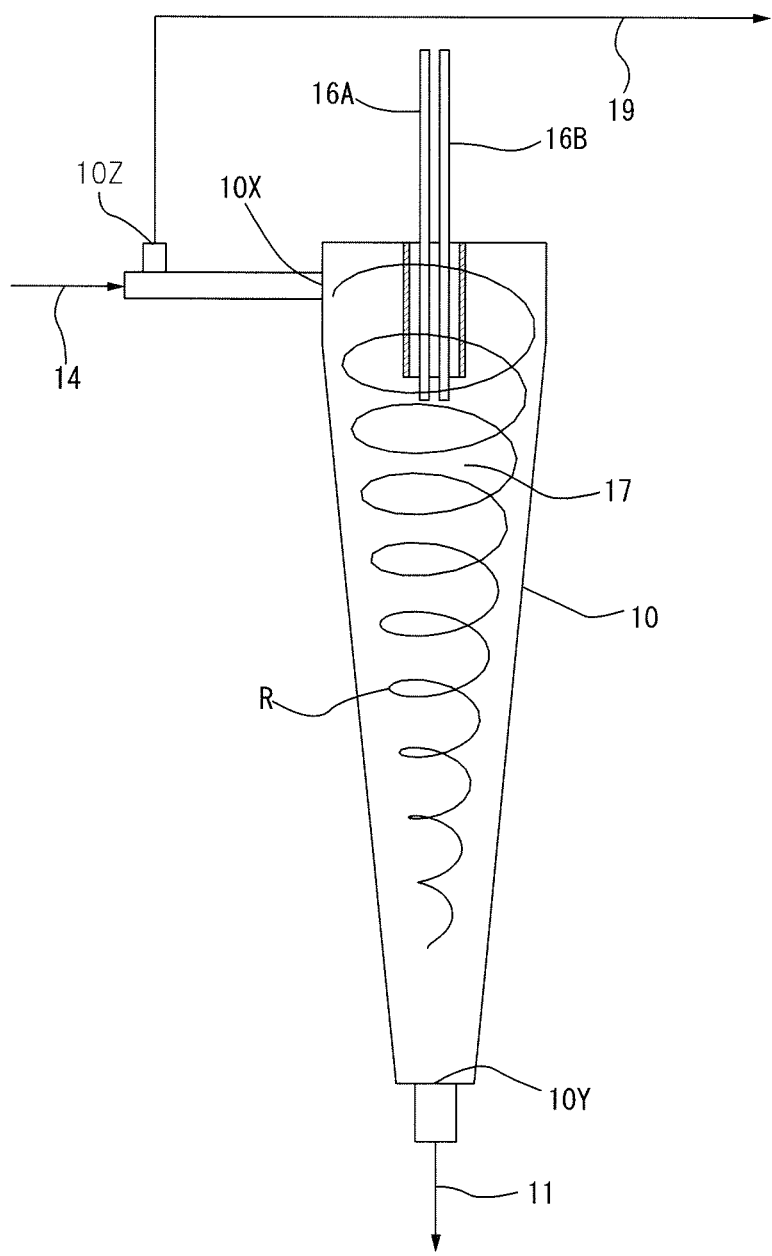
FIG. 15 is the schematic diagram of further another embodiment example.

While in the embodiment of FIG. 2, as stated before, the additional liquid is injected at a relatively lower portion of the reaction processing vessel 10. However, as shown in FIG. 15, the guide tube 17 is shortened and the injection tubes 16A, 16B, . . . for the liquid A to C may be provided at the upstream side. Alternatively, the guide tube is omitted and the injection tubes may be provided at the end. Further, as shown in FIG. 2, the leading tips of the injection tubes 16A, 16B, . . . may reach at different levels or may reach at the same level.

According to the embodiment illustrated in FIG. 15, the reaction length in the spiral flow field can be increased so that the adhesion of the materials in the flow path in the downstream side is decreased to a great degree.

Further, an embodiment is shown in the drawing where the overflow is occurred in a pipe before the liquid is injected.

The metal agglomerated particles obtained by the manufacturing method of the present invention can be used as the cathode active material for the lithium ion battery. Precisely, the cathode active material for the lithium ion battery can be used for manufacturing the lithium ion battery, and finally the battery can be also obtained by the present invention.

According to the present invention, the metal agglomerated particles having the small and uniform particle diameter and the substantially globular shape can be obtained. Hence, in utilizing such particles as the cathode active material for the lithium ion battery, it is noted that the characteristics of the cathode are improved.

EXAMPLES

Next, by way of examples and comparative examples, the effects of the present invention will be clearly shown.

Example 1

Example of Nickel Manganese Cobalt Hydroxide

As the reactant A, 1.6 M liquid obtained such that nickel sulfate, manganese sulfate, and cobalt sulfate are mixed at a ratio of 1:1:1 was used. As a reactant B, 25% sodium hydroxide was used, and as a reactant C, 25% ammonia water was used. To advance predetermined reaction, it is common that solvent adjustment is performed to the reactant A by addition of ammonium sulfate, hydrogen peroxide, ethanol, glycerin, or the like and in this example, 0.1 M of ammonium sulfate was added.

The reactant A, the reactant B, and the reactant C were injected into the reaction processing vessel 10 in the embodiment of FIGS. 1 to 4.

A start mother liquor prepared such that 40 g of ammonia water is added to 2 kg of ion exchange water was used.

The circulation pump was operated at 20 L/min, about 120 g/min of the reactant A, about 40 g/min of the reactant B, and about 3 g/min of the reactant C were injected. Further, 50 ml/min of an N2 gas was injected.

Figure 17:
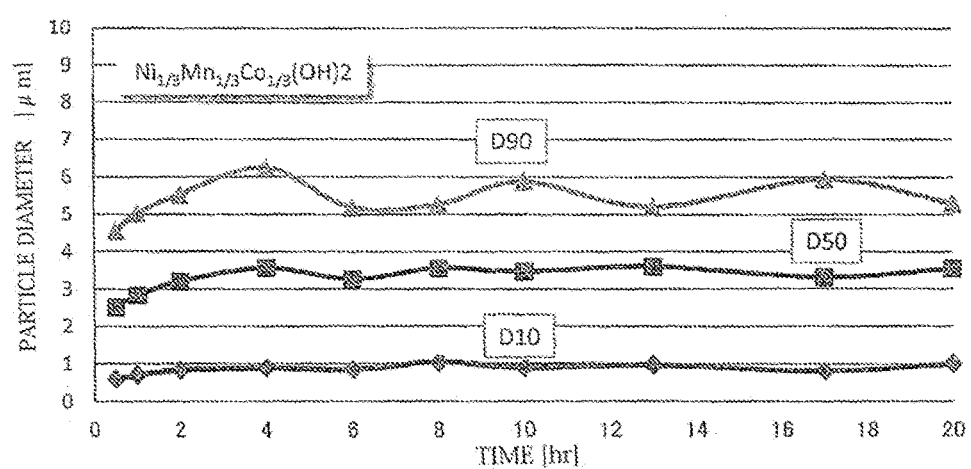
FIG. 17 is the graph of variation in particle diameters of Example 1.
Figure 18:
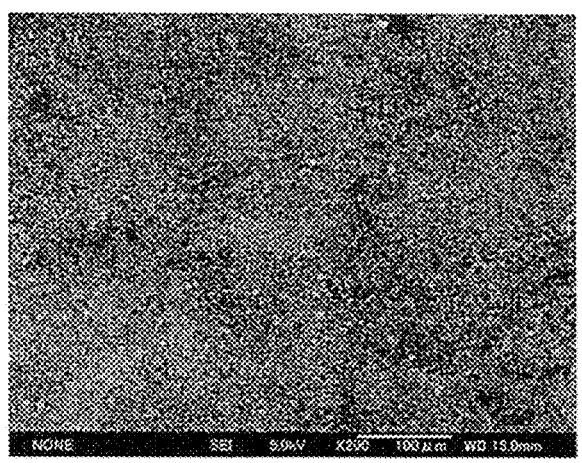
FIGS. 18(a) to 18(c) are the SEM photographs of particles of Example 1.
Figure 18:
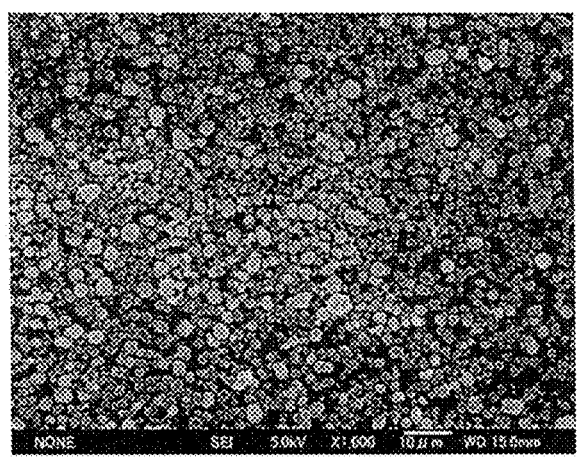
Figure 18:
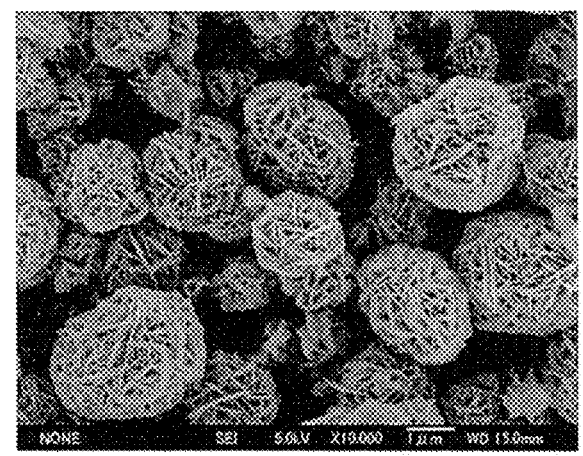

Variation results with time of particle diameters are shown in the graph of FIG. 17 and SEM photographs of the particles taken when the operation had been performed for 20 hours are shown in FIGS. 18(*a*), 18(*b*), and 18(*c*).

<Discussion>

The particle diameters are small, and are stable with time.

Figure 19:
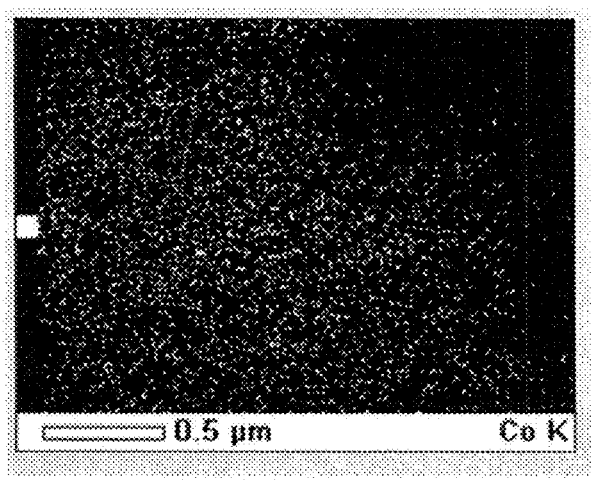
FIGS. 19(a) to 19(c) are the mapping photographs of elements of Comparative Example 1.
Figure 19:
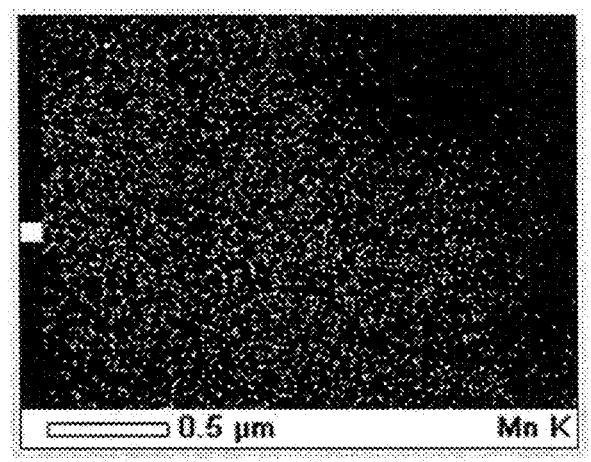
Figure 19:
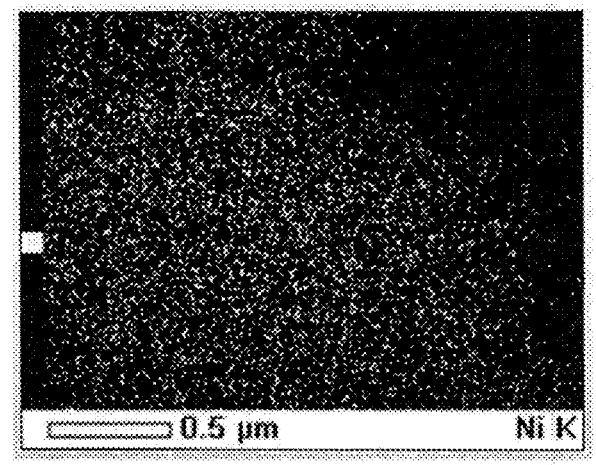

Meanwhile, as a result of element mapping, it has been found out that each element is uniformly diffused and arranged. The result is shown in FIGS. 19(*a*), 19(*b*), and 19(*c*).

Further, there was no adhesion of the materials to the inner wall surface of the circulation path even after the operation had been performed for 20 hours (a transparent plastic pipe was used for the circulation path, and presence of the adhesion of the materials was visually observed from the outside).

Comparative Example 1

Example of Nickel Manganese Cobalt Hydroxide

Nickel manganese cobalt hydroxide particles were obtained in a typical stirred reactor with a draft tube as illustrated in FIG. 16.

As the reactant A, 1.6 M liquid obtained such that nickel sulfate, manganese sulfate, and cobalt sulfate were mixed at a ratio of 1:1:1 was used.

As the reactant B, sodium hydroxide of 25% concentration, as the reactant C, ammonia water of 25% concentration were used.

The stirring machine was operated with a speed of rotation of 2000 rpm. About 10 g/min of the reactant A, about 4 g/min of the reactant B, and about 0.6 g/min of the reactant C were injected around the rotor blade of the stirred reactor, and 100 ml/min of N2 gas was injected into a lower portion of the stirred reactor. The device system was operated with about 4 L of the capacity.

Figure 20:
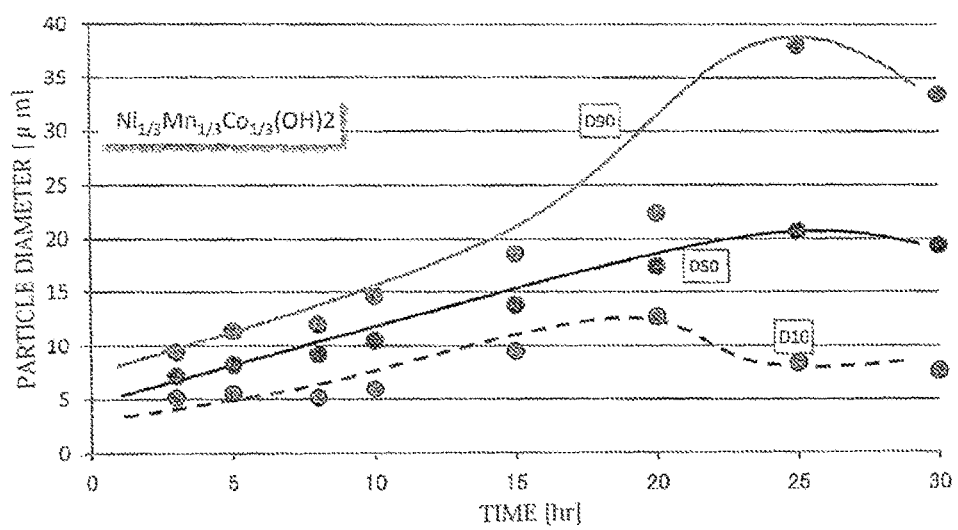
FIG. 20 is the graph of variation in particle diameters of Comparative Example 1.
Figure 21:
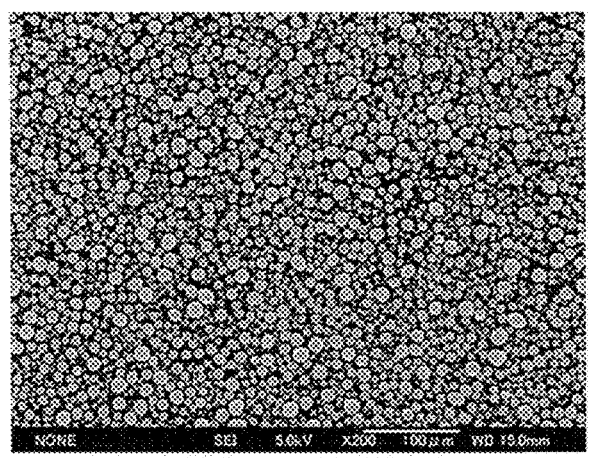
FIGS. 21(a) to 21(c) are the SEM photographs of particles of Comparative Example 1.
Figure 21:
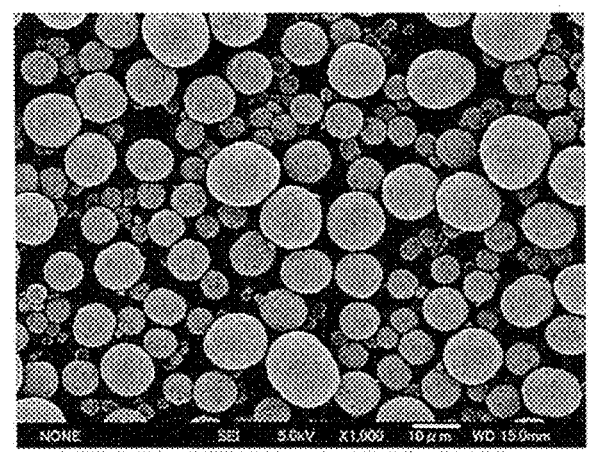
Figure 21:
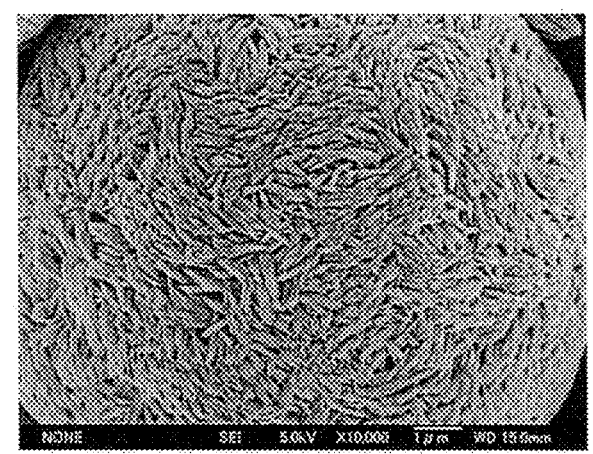

Variation results of the particle diameters obtained from the operation for 30 hours are shown in the graph of FIG. 20, and SEM photographs of the particles taken when the operation had been performed for 15 hours are illustrated in FIGS. 21(*a*), (*b*), and (*c*).

Figure 22:
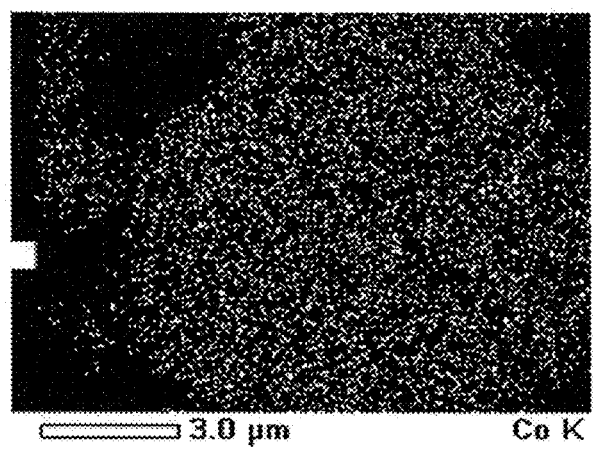
FIGS. 22(a) to 22(c) are the mapping photographs of elements of Example 1.
Figure 22:
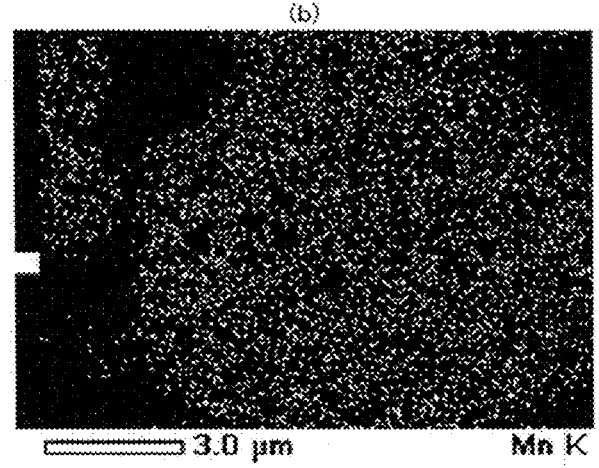
Figure 22:
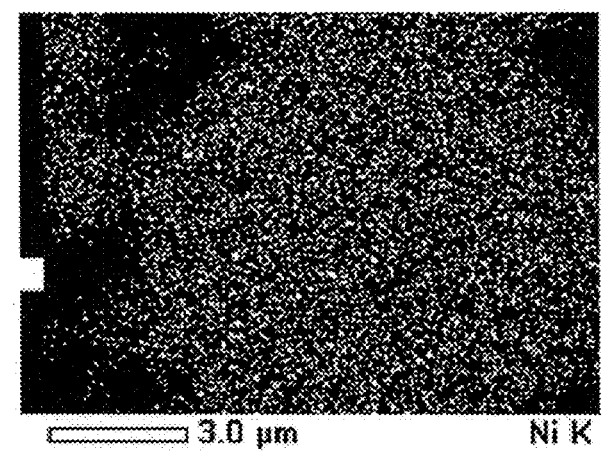

As the result of element mapping, it has been found out that each element was uniformly diffused and arranged. The result is illustrated in FIG. 22.

According to these results, in comparative example 1, the particle diameters are large, and are unstable with time.

Note that the element mapping was performed under conditions below.

Analysis Instrument
 Manufacturer: JEOL
 Model: JSM6335F
 Analysis: SEM-EDS
Specifications
 Acceleration voltage: 20 kV
 Magnification: 20,000× in Example 1, 3,000× in Comparative Example 1
 Scanning: 150 cycles
 Measuring: 30 minutes

Example 2

Example of Nickel Manganese Carbonate

As the reactant A, 1.6 M liquid obtained such that nickel sulfate and manganese sulfate are mixed at a ratio of 1:2 was used.

As the reactant B, ammonium bicarbonate of 15% concentration, and as the reactant C, ammonia water of 25% concentration were used.

To advance predetermined reaction, it is common that solvent adjustment is performed to the reactant A by addition of ammonium sulfate, hydrogen peroxide water, ethanol, glycerin, or the like and in this example, 0.1 M of ammonium sulfate was added.

The reactant A, the reactant B, and the reactant C were injected into the reaction processing vessel 10 in the embodiment of FIGS. 1 to 4.

A start mother liquor prepared such that 300 g of ammonia water is added to 6 kg of ion exchange water was used.

A circulation pump was operated at 20 L/min, about 260 g/min of the reactant A, about 260 g/min of the reactant B, and about 8 g/min of the reactant C were injected. Further, 10 ml/min of a CO2 gas was injected (N2 gas may alternatively be used).

Figure 23:
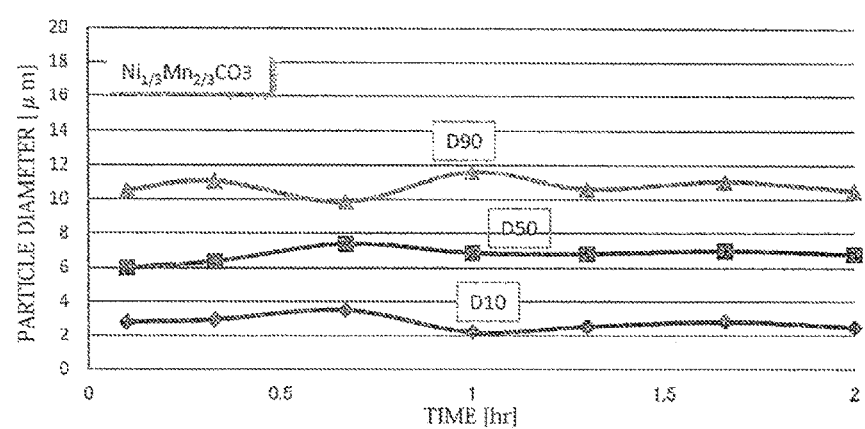
FIG. 23 is the graph of variation in particle diameters of Example 2.
Figure 24:
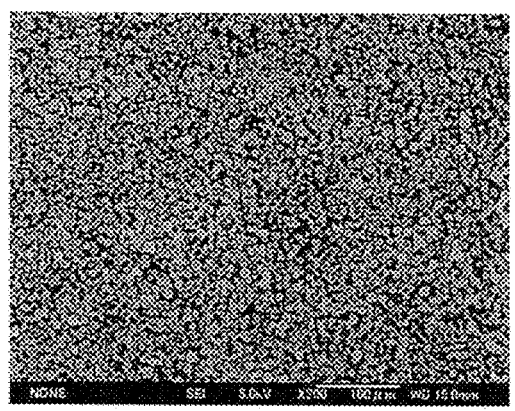
FIGS. 24(a) to 24(c) are the SEM photographs of particles in Example 2.
Figure 24:
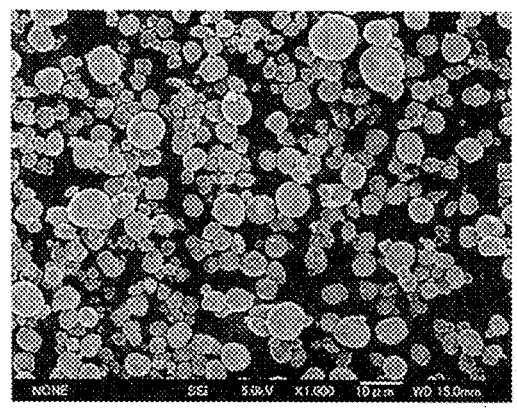
Figure 24:
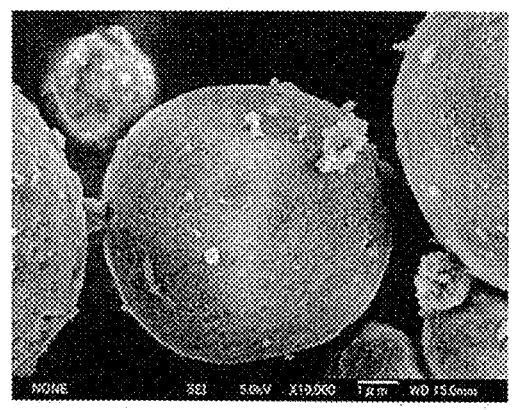

Variation results with time of particle diameters are shown in the graph of FIG. 23 and SEM photographs of the particles taken when the operation had been performed for 2 hours are shown in FIGS. 24(*a*), (*b*), and (*c*).

<Discussion>

The particle diameters are small, and are stable with time.

Comparative Example 2

Example of Nickel Manganese Carbonate

Nickel manganese carbonate particles were obtained in a typical stirred reactor with a draft tube as illustrated in FIG. 16.

As the reactant A, 1.6 M liquid obtained such that nickel sulfate and manganese sulfate were mixed at a ratio of 1:2 was used.

As the reactant B, sodium hydroxide of 15% concentration, as the reactant C, ammonia water of 25% concentration were used.

The stirring machine was operated with a speed of rotation of 2000 rpm. About 25 g/min of the reactant A, about 18 g/min of the reactant B, and about 2 g/min of the reactant C were injected around the rotor blade of the stirred reactor, and 100 ml/min of CO2 gas was injected into a lower portion of the stirred reactor. The device system was operated with about 2.5 L of the capacity.

Figure 25:
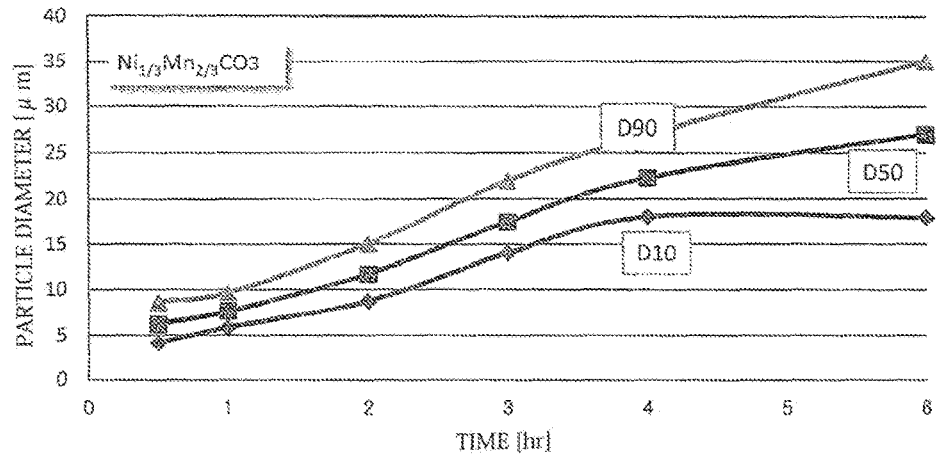
FIG. 25 is the graph of variation in particle diameters of Comparative Example 2.
Figure 26:
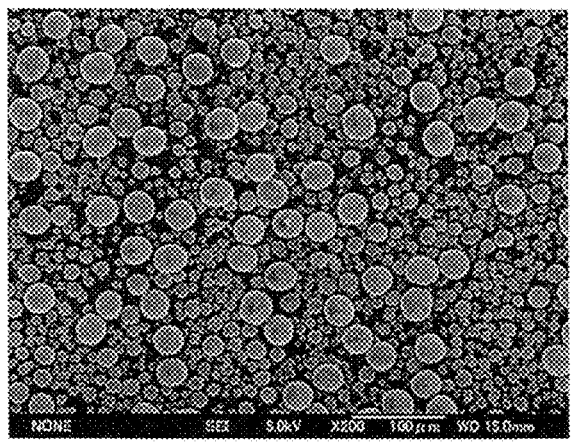
FIGS. 26(a) to 26(c) are the SEM photographs of particles of Comparative Example 2.
Figure 26:
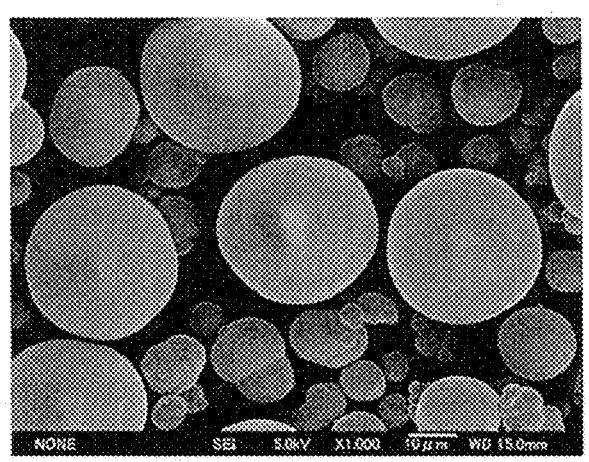
Figure 26:
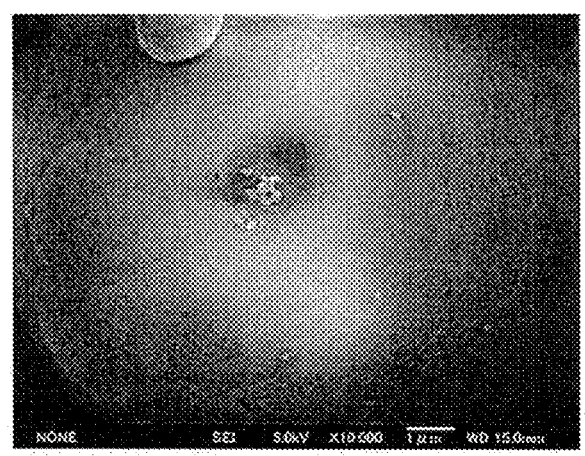

Variation results of the particle diameters obtained from the operation for 6 hours are shown in the graph of FIG. 25, and SEM photographs of the particles taken when the operation had been performed for 6 hours are illustrated in FIGS. 26(*a*), (*b*), and (*c*).

According to these results, also in comparative example 2, the particle diameters are large, and are unstable with time.

INDUSTRIAL APPLICABILITY

The present invention can be applied to various types of use in addition to a cathode active material for a lithium ion battery.

REFERENCE SIGNS LIST

10 Reaction processing vessel
10X Inflow port
10Y Outflow port
10Z Overflow port
11 and 14 Circulation path
16A and 16B Injection tube
17 Guide tube
20 Storage vessel
40 Rotary barrel
A, B, and C Additional liquid

The invention claimed is:
1. A method of manufacturing reaction agglomerated particles, the method comprising:
setting a liquid flow in a reaction processing vessel to a spiral flow of a reaction liquid;
extracting the reaction liquid from the processing vessel;
returning the extracted reaction liquid to the reaction processing vessel;
generating the spiral flow in the reaction processing vessel by introducing the returned reaction liquid along an inner peripheral surface of the reaction processing vessel;
injecting an additional liquid containing an inorganic substance at a center-side position with respect to an inner surface of the reaction processing vessel so as to perform reaction processing for obtaining the reaction agglomerated particles.
2. The method of manufacturing reaction agglomerated particles according to claim 1, wherein an inflow velocity of the returned reaction liquid introduced into the reaction processing vessel is 0.5 msec or more.
3. The method of manufacturing reaction agglomerated particles according to claim 1, wherein
the reaction liquid is extracted from the reaction processing vessel at an outflow velocity of 0.5 msec or more.
4. The method of manufacturing reaction agglomerated particles according to claim 1, wherein
an inflow position of the returned reaction liquid introduced into the reaction processing vessel is one end portion of the reaction processing vessel in a longitudinal direction, and
the reaction liquid is extracted from another end portion of the reaction processing vessel in the longitudinal direction after the reaction processing so as to be returned to the reaction processing vessel as the returned reaction liquid.
5. The method of manufacturing reaction agglomerated particles according to claim 1, wherein
an inflow position of the returned reaction liquid introduced into the reaction processing vessel is one end portion of the reaction processing vessel in a longitudinal direction,
an outflow position of the reaction liquid extracted from the reaction processing vessel after the reaction processing is another end portion of the reaction processing vessel in the longitudinal direction, and
a final reaction processing liquid is discharged from an upstream side with respect to an injection portion of the additional liquid injected into the reaction processing vessel.
6. The method of manufacturing reaction agglomerated particles according to claim 1, wherein
an inner surface of the reaction processing vessel is tapered from one end portion to another end portion in a longitudinal direction,
an inflow position of the returned reaction liquid is the one end portion of the reaction processing vessel in the longitudinal direction, and
an outflow position of the reaction liquid extracted from the reaction processing vessel after the reaction processing is the other end portion of the reaction processing vessel in the longitudinal direction.
7. The method of manufacturing reaction agglomerated particles according to claim 1, wherein
the additional liquid is injected in a downstream direction of the spiral flow of the liquid.
8. The method of manufacturing reaction agglomerated particles according to claim 1, wherein
the additional liquid is injected in an upstream direction of the spiral flow of the liquid.
9. The method of manufacturing reaction agglomerated particles according to claim 1, comprising circulating the liquid for the reaction processing vessel, wherein
midway in the circulating, an external reactor is provided, which has a stirring blade and a different structure from that of the reaction processing vessel,
a part of a final reaction processing liquid is extracted outside from the reaction processing vessel so as to be sent to the external reactor where the reaction liquid is produced through a reaction, and
the reaction liquid is returned to the reaction processing vessel.
10. The method of manufacturing reaction agglomerated particles according to claim 1, comprising circulating the liquid for the reaction processing vessel, wherein
midway in the circulating, two external tanks are provided in series,
a downstream-side external tank is an external sedimentation separation tank, to which the additional liquid is not injected, and in which sedimentation and separation are performed, and
only a group of fine particles in an upper portion of the external sedimentation separation tank is returned to the reaction processing vessel.

11. The method of manufacturing reaction agglomerated particles according to claim 1, comprising circulating the liquid for the reaction processing vessel, wherein midway in the circulating, an external sedimentation separation tank, to which the additional liquid is not injected, and in which sedimentation and separation are performed, and only a group of fine particles in an upper portion of the external sedimentation separation tank is returned to the reaction processing vessel.

12. The method of manufacturing reaction agglomerated particles according to claim 1, wherein a pump is used as a unit for introducing the returned reaction liquid to the reaction processing vessel.

* * * * *